3,278,630
PRODUCTION OF ETHYLENE

Robert L. Hartnett, Texas City, Tex., assignor to Monsanto Company, St. Louis, Mo., a corporation of Delaware
No Drawing. Filed Apr. 21, 1964, Ser. No. 361,590
4 Claims. (Cl. 260—683.3)

This invention relates to an improved process for the production of olefins from saturated hydrocarbons. More particularly, it relates to the production of ethylene from ethane.

It is well known that olefins can be obtained by thermal decomposition of petroleum-derived hydrocarbons. Ethylene can be obtained, for example, by thermal conversion of light saturated hydrocarbons such as ethane and/or propane. However, in such a process the gaseous conversion product contains, in addition to the desired ethylene, significant amounts of other products such as methane, propylene, acetylene, butenes, and the like. In order to recover the ethylene in sufficiently pure form for its utilization, the gaseous thermal conversion product must be processed by fractionation in a series of steps requiring fairly elaborate equipment and time consuming operations. Furthermore, non-gaseous hydrocarbons such as oils and tars and normally cyclic hydrocarbons are formed simultaneously with the ethylene. Provision must be made for removal of such contaminants because they lead to fouling of the apparatus and equipment. Thus, despite extensive studies which have been made on cracking of light hydrocarbons to produce ethylene, there are still some disadvantages in commercial production by this method.

Some of the problems inherent in the production of ethylene by cracking techniques can be obviated by producing this hydrocarbon in a relatively pure state by catalytic dehydrogenation of ethane. However, the art has thus far failed to provide a continuous process for the dehydrogenation of ethane to ethylene which is not subject to a number of drawbacks. Known catalysts for the dehydrogenation suffer from deficiencies in that they either result in low conversion to dehydrogenation products or to low yields of ethylene or are deficient in both respects. Prior art catalysts, too, become readily fouled with carbon deposits which render them ineffective in the dehydrogenation process and necessitate frequent and sometimes expensive regeneration. The advantages of a process wherein conversion of ethane to ethylene can be effected with fewer operational steps and less by-product formation are, therefore, immediately obvious.

A relatively simple process for producing ethylene from ethane in good conversion and high yields and with comparatively little loss to non-useful by-products has been described and claimed in a co-pending application, Serial No. 361,589, filed April 21, 1964. In this process, ethane is reacted with hydrogen chloride and oxygen at an elevated temperature in the presence of activated alumina. It has now been discovered that either the conversion or yields or both in such a process can be significantly improved if instead of activated alumina alone, a catalyst consisting of calcium chloride supported on activated alumina is employed for the reaction.

According to the present invention, then, ethylene is produced by bringing a mixture of ethane, hydrogen chloride and oxygen in contact at elevated temperatures with a catalyst consisting essentially of a minor amount of calcium chloride supported on activated alumina. Only small amounts of chlorinated by-products are produced which are readily separable from ethylene, fewer steps are required for recovery of ethylene than are generally employed in the prior art, and the hydrogen chloride employed can be continuously recycled in the process.

The invention is illustrated in the following examples which, however, are not to be construed as limiting it in any manner whatsoever.

EXAMPLE 1

A tubular reactor about 6 ft. long and 60 mm. in diameter wrapped with Nichrome wire for heating and covered with asbestos insulation was employed as the reactor. A thermowell containing thermocouples for measuring temperatures was centrally positioned in the reactor extending throughout its length. Approximately 1000 g. of a catalyst consisting of 5% by weight of calcium chloride supported on activated alumina was charged to the reactor and fluidized by passing nitrogen up through it while the reactor was brought up to reaction temperature. The catalyst had been prepared by dissolving calcium chloride in methanol, saturating the activated alumina with the solution, and drying the resulting slurry in a rotary vacuum drier.

Hydrogen chloride and oxygen at approximate rates of 0.06 and 0.03 s.c.f.m. (standard cubic feet per minute), respectively, were passed through rotameters into a common manifold where they were mixed and from which they were then introduced into the bottom inlet of the reactor to contact the fluidized catalyst maintained at a temperature from about 400° C. to about 600° C. Ethane, at a rate of about 0.06 s.c.f.m., was fed separately through a rotameter and injected simultaneously into the fluidized catalyst in the reactor at a point about 5 inches above the bottom inlet. As the reactants were introduced, the flow of nitrogen was appropriately reduced so that the velocity of the entering gaseous reactants helped to maintain the catalyst in the fluidized state. Contact time was approximately 4.7 seconds.

Effluent gases from the top of the reactor were passed directly into a gas chromatograph for analysis. From the analysis of the reaction product collected at various temperature levels, total conversion of ethane, conversion of ethane to ethylene, and yields of ethylene were calculated. Results are presented in Table 1 below.

Table 1

| Temperature, ° C. | Total $C_2H_6$ Conv., percent | Conv. to $C_2H_4$, percent | Yield of $C_2H_4$, percent |
|---|---|---|---|
| 420 | 4.8 | 3.5 | 72 |
| 475 | 13.7 | 10.6 | 78 |
| 495 | 14.5 | 11.7 | 81 |
| 530 | 24.4 | 20.2 | 82.5 |
| 540 | 35.5 | 31.5 | 88 |
| 550 | 41.7 | 37.5 | 90 |
| 560 | 44.0 | 41 | 93 |
| 585 | 54.6 | 52 | 95 |

EXAMPLE 2

The experiment of Example 1 was repeated except that activated alumina was substituted for the catalyst employed in that example. The average conversion of ethane, conversion to ethylene, and yield of ethylene obtained using activated alumina within the optimum temperature range of 550 to 590° C. are presented in Table 2 below. Alongside these values are tabulated the average values obtained under comparable optimum temperature conditions with the catalyst consisting of calcium chloride supported on activated alumina used in Example 1. These data provide convincing evidence that impregnation of activated alumina with a minor amount of calcium chloride results in a highly improved catalyst for the production of ethylene from ethane via reaction of the latter with hydrogen chloride and oxygen. Moreover, this catalyst can be used at lower temperatures than can activated alumina alone.

Table 2

|  | Activated Alumina | CaCl₂ on Activated Alumina |
| --- | --- | --- |
| Total $C_2H_6$ Conv., percent | 43.0 | 46.8 |
| Conv. to $C_2H_4$, percent | 35.0 | 43.5 |
| Yield of $C_2H_4$, percent | 80.6 | 92.7 |

It is readily apparent that various modifications of reaction conditions given in the examples can be made without departing from the scope of the invention. In the preferred embodiment of the invention, the catalyst is employed in the fluidized or pseudo liquid state. It is maintained in a fluid or suspended state by the gaseous reactants themselves or, optionally, by the use of an additional inert gas introduced from an outside source. The use of a fixed bed operation, however, is not precluded.

The catalyst of the process is readily prepared by saturating activated alumina with a solution, aqueous or otherwise, of calcium chloride and filtering and drying the impregnated alumina. Further drying may be effected by means of a flow of nitrogen (or other inert gas), hydrogen chloride and/or air through the mass of catalyst while it is being heated to reaction temperature after it has been charged to the reactor. A more active catalyst is prepared from a methanolic solution of calcium chloride. Better catalytic activity can probably be attained with a catalyst prepared and dried under vacuum. Generally, amounts of calcium chloride from about 1% to about 15% by weight of the total catalyst composition are supported on the activated alumina. The preferred catalyst compositions contain from about 5% to about 10% calcium chloride.

The preferred method of introducing the reactants is that which is exemplified, that is, the hydrogen chloride and oxygen are introduced into the bottom of the reactor while ethane is injected at a point somewhat above the bottom inlet point. The point of ethane injection is suitably located at a distance of from about 5% to about 20% of the reactor length above the inlet of the other reactants. Optimum results are obtained with the ethane being injected at a point from about 7 to about 10% of the reactor length above the bottom inlet. The reaction may be carried out by mixing the ethane, hydrogen chloride and oxygen or air and passing the mixture into the reactor, or by introducing oxygen or air into a mixture of ethane and hydrogen chloride. These latter methods are, however, much less satisfactory than the preferred one. Precaution should be taken to avoid mixing ethane and oxygen in the absence of hydrogen chloride to prevent creation of possible hazardous conditions.

As is evident from the examples, the relative proportions of the reactants may vary considerably. Ratios of ethane to hydrogen chloride to oxygen varying from 1:0.5:0.2 to 1:2:1 can be used. If is understood that the oxygen for the reaction may, of course, be supplied in the form of air and when air is used the mole ratio of ethane to hydrogen chloride to air may vary from 1:0.5:1 to 1:2:5. Preferably, the mole ratio when oxygen is employed is maintained at about 1:1:0.3 and correspondingly at 1:1:1.5 when air is used. Since little hydrogen chloride is consumed in the reaction, only very small amounts, if any, of hydrogen chloride need be fed once the reaction has been initiated if provision is made for recycle of the hydrogen chloride.

Contact time is not a critical variable and may vary from about 1 to about 30 seconds. Preferred contact times are those from about 5 to about 20 seconds.

Reaction temperature is a critical factor. The temperature must be maintained above about 390° C. to effect the reaction. Generally, a suitable temperature range for the reaction is that from 400 to 600° C., although temperatures up to about 625° C. or 650° C. can be employed. At too high temperatures, however, carbon begins to deposit on the catalyst. Preferably, the temperature of the reaction is maintained from about 550° to about 590° C.

What is claimed is:

1. A process for the production of ethylene which comprises contacting a mixture of ethane, hydrogen chloride and oxygen in a mole ratio in the range from about 1:0.5:0.2 to 1:2:1 with a catalyst consisting essentially of calcium chloride supported on activated alumina at a temperature within the range from about 400° to about 600° C.

2. A process for the production of ethylene which comprises contacting a mixture of ethane, hydrogen chloride and oxygen in a mole ratio in the range from about 1:0.5:0.2 to 1:2:1 with a catalyst consisting essentially of from about 1% to about 15% by weight based on the total catalyst composition of calcium chloride supported on activated alumina at a temperature within the range from about 400° to about 600° C.

3. A process for the production of ethylene which comprises contacting a mixture of ethane, hydrogen chloride and oxygen in a mole ratio of 1:1:0.3 at a temperature within the range from about 550° to about 590° C. with a catalyst consisting essentially of from about 5% to about 10% by weight of calcium chloride supported on activated alumina.

4. A process for the production of ethylene which comprises passing ethane, hydrogen chloride and oxygen in a mole ratio of 1:1:0.3 through a fluidized bed of catalyst consisting essentially of from about 1% to about 15% by weight of calcium chloride supported on activated alumina maintained at a temperature from about 400° to about 600° C. by introducing hydrogen chloride admixed with oxygen into the bottom of said bed while injecting ethane at a point which is from about 5% to about 20% of the reactor length above the bottom of said bed.

References Cited by the Examiner

UNITED STATES PATENTS

| | | | |
| --- | --- | --- | --- |
| 2,397,638 | 4/1946 | Bell et al. | 260—683 |
| 2,921,101 | 1/1960 | Magovern | 260—680 |
| 3,207,806 | 9/1965 | Bajars | 260—680 |

DELBERT E. GANTZ, *Primary Examiner.*

G. E. SCHMITKONS, *Assistant Examiner.*